North American Patent Office 2,765,303
Patented Oct. 2, 1956

2,765,303

PROCESS FOR MANUFACTURING 1-(2-BENZIMIDAZOLYL)-2-(2-BENZOXAZOLYL) ETHYLENE

Peter Kovacic, Cranston Heights, Del., assignor to E. I. du Pont de Nemours and Company, Wilmington, Del., a corporation of Delaware No Drawing. Application August 10, 1955, Serial No. 527,639

4 Claims. (Cl. 260—240)

This invention relates to an improved process for manufacturing 1-(2-benzimidazolyl)-2-(2-benzoxazolyl) ethylene, which is useful as a whitening agent for textile fiber. It is an object of this invention to provide an efficient and economical process for producing said compound in good yield and a high state of purity on a commercial scale. Various other objects and achievements of this invention will appear as the description proceeds.

It has already been suggested to prepare the above compound by treating 1-(2-benzimidazolyl)-2-(2-benzoxazolyl) ethane with an oxidizing agent, such as mercuric acetate (U. S. P. 2,483,392). The reaction is believed to proceed according to the following equation:

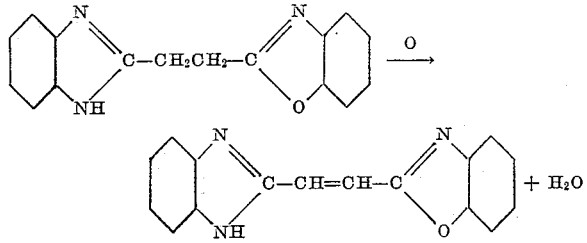

However, mercuric acetate is not well adapted for production on a commercial scale, firstly because of its relatively high cost, secondly because of the health hazard inherently associated with mercury compounds, and thirdly because the resulting product is rather difficult to purify.

I have now found that the aforementioned ethane compound can be readily and economically converted into the said ethylene compound by treating the same with a halogenating agent in an inert organic solvent, at temperatures above 100° C. and in the presence of iodine. The above result is surprising, because although it is already known to convert certain diaryl ethane compounds into corresponding diaryl ethylene compounds by the aid of halogenating agents, the agents hitherto proposed have been water-soluble agents (e. g. sodium hypochlorite) applied from an aqueous solution, or bromine applied in the absence of iodine. Neither of these conditions, however, gives satisfactory results when applied to the object of this invention. Furthermore, under the mentioned conditions of the prior practice, considerable halogenation in the nucleus takes place (see for instance U. S. P. 2,346,000), whereas my invention seeks the production of said fluorescent ethylene compound with a minimum of halogenation in the nucleus.

Accordingly, this invention comprises a process for the production of 1-(2-benzimidazolyl)-2-(2-benzoxazolyl) ethylene by reacting upon the corresponding ethane compound with halogenating agents under the following particular conditions:

The halogenating agent is selected from the group consisting of bromine, chlorine, phosphorus pentachloride, sulfuryl chloride, thionyl chloride, sulfur monochloride and sulfur dichloride, and its quantity is not less than 1 mole nor more than 2 moles per mole of initial ethane compound.

The initial ethane compound is dissolved in an organic liquid which is inert to halogenation and which is maintained at a temperature not less than 100° nor greater than 190° C. As instances of economically available, suitable inert solvents may be named nitrobenzene, trichlorobenzene and glacial acetic acid.

Iodine is added in catalytic quantities, say 1% by weight based on the weight of initial ethane compound, but it may be present in much larger quantities, even up to a 1:1 mole ratio, except for considerations of economy.

The halogenating agent is preferably fed into the solution of the ethane compound and catalyst, at a uniform rate, so as to avoid excessive rate of reaction. The total period of reaction, however, is kept short, say not exceeding 1 hour in plant practice. Sampling of the reaction mass and testing the product for fluorescent strength will generally assist in determining the end point of the reaction.

Upon completion of the reaction a base is preferably added to neutralize any HCl or HBr formed in the reaction, and which may be present as such or in loose combination with the final or intermediate reaction products present in the mass. As suitable alkalizing agents for the above purpose, may be used sodium hydroxide, potassium hydroxide, sodium or potassium acetate and various organic amines such as diethanolamine.

Following alkalization, the mass is steam distilled to remove the solvent, then filtered, washed and dried to obtain the desired compound. The inorganic salts formed in the alkalization step are eliminated in the aqueous filtrates.

Without limiting this invention, the following examples are given to illustrate my preferred mode of operation. Parts mentioned are by weight.

Example 1

6.7 parts of sulfuryl chloride were added during one-fourth hour at 140° to 150° C. to a solution of 7.8 parts of 1-(2-benzimidazolyl)-2-(2-benzoxazolyl) ethane in 36 parts of nitrobenzene containing 0.16 part of iodine. After ten minutes longer at 140° to 150° C., the mixture was heated for one-half hour at 80° C. with a solution of 6 parts of potassium hydroxide in 14.4 parts of 95% ethanol. After removal of organic solvents by steam distillation, the product was filtered, washed and dried. 1-(2-benzimidazolyl)-2-(2-benzoxazolyl) ethylene was thus obtained in the form of a tan-colored powder, in excellent yield. It contained a small amount of chlorine (less than 3%), and produced a strong white fluorescence on cotton and nylon fibers.

When the above procedure was repeated except omitting the iodine catalyst, the yield dropped to about ⅓ of its high value above noted.

Example 2

9 parts of sulfuryl chloride were added during one-half hour at 175° to 185° C. to a solution of 11.7 parts of 1-(2-benzimidazolyl)-2-(2-benzoxazolyl) ethane in 38 parts of nitrobenzene containing 0.7 part of iodine. After 5 minutes longer at 175° to 185° C., the mixture was heated for one-half hour at 85° to 90° C. with a solution of 13.3 parts of potassium acetate in 21 parts of isopropanol and 3 parts of water. The product (11.4 parts) was isolated by steam-distilling the solvents and then filtering, washing and drying. It resembled the product obtained in Example 1.

Example 3

The procedure in Example 2 was followed except that sulfuryl chloride was added at 110° to 120° C. and the mixture then kept at 110° to 120° C. for 5 minutes. The dried product resembled that obtained in Example 2 except that the latter was somewhat superior in fluorescent strength on cotton fiber.

*Example 4*

Sulfuryl chloride in amounts varying from 10% excess to 100% excess of theory (i. e. 6.7 parts to 12.0 parts) was added during one-half hour at 140° to 150° C. to solutions of 11.7 parts of 1-(2-benzimidazolyl)-2-(2-benzoxazolyl) ethane in 38 parts of nitrobenzene containing 0.7 part of iodine. After 5 minutes longer at 140° to 150° C., each mixture was heated for one-half hour at 85° to 90° C. with a solution of 13.3 parts of potassium acetate in 21 parts of isopropanol and 3 parts of water. The products were isolated by steam-distilling the solvents and then filtering, washing and drying. They were similar to the product obtained in Example 1.

*Example 5*

72 parts of sulfuryl chloride were added during one-half hour at 150° to 155° C. to a mixture of 93.6 parts of 1-(2-benzimidazolyl)-2-(2-benzoxazolyl) ethane in 700 parts of trichlorobenzene containing 6 parts of iodine. After an additional five minutes at 150° to 155° C., the mixture was heated at 80° to 90° C. for 20 minutes with a solution of 106 parts of potassium acetate in 210 parts of 95% ethanol. The product was isolated by filtration after removal of organic solvents by steam distillation, and was similar to the material obtained in Example 1 in its whitening effect on cotton and nylon fibers.

*Example 6*

3 parts of sulfuryl chloride were added during one-half hour at the reflux temperature to a solution of 3.9 parts of 1-(2-benzimidazolyl)-2-(2-benzoxazolyl) ethane in 63 parts of acetic acid containing 0.2 part of iodine. After an additional one-fourth hour of reflux, the acetic acid was removed by distillation under reduced pressure. The residue was heated at reflux for one-half hour with a solution of 6.1 parts of sodium acetate trihydrate in 120 parts of 95% ethanol. The mixture was then cooled, diluted with 800 parts of water, acidified with acetic acid and filtered. The product was obtained as an orange-brown solid and produced a whitening effect on cotton and nylon fibers similar to that produced by the product of Example 1.

*Example 7*

A mixture of 2.8 parts of bromine in 21 parts of acetic acid was added during one hour at the reflux temperature to a solution of 3.9 parts of 1-(2-benzimidazolyl)-2-(2-benzoxazolyl) ethane in 63 parts of acetic acid containing 0.04 part of iodine. After an additional one and one-half hours at the reflux temperature, the acetic acid was removed by distillation under reduced pressure. Ethanol (95%, 120 parts) was added to the residue, the mixture neutralized with 30% sodium hydroxide aqueous solution and then 20 parts of the aqueous sodium hydroxide solution were added. After one and one-half hours at reflux the mixture was diluted with water and the product was isolated by filtration, washing and drying. It was light brown in color and showed good fluorescence intensity on cotton fabric.

When the same procedure was repeated in the absence of iodine, the yield dropped to about one half.

*Example 8*

A mixture of 11.3 parts of bromine in 24 parts of nitrobenzene was added during one-fourth hour at 140° to 150° C. to a solution of 15.6 parts of 1-(2-benzimidazolyl)-2-(2-benzoxazolyl) ethane in 290 parts of nitrobenzene containing 0.32 part of iodine. After the addition, the mixture was heated for 10 minutes at 140° to 150° C. and then stirred for three-fourths hour at 80° C. with a solution of 8 parts of potassium hydroxide in 65 parts of ethanol. The product was isolated by filtration after removal of the organic solvents by steam distillation. The dried product was olive-brown in color and exhibited good fluorescence intensity on cotton fabric.

*Example 9*

4.5 parts of chlorine gas were fed in during one-half hour at 140° to 150° C. to a solution of 11.7 parts of 1-(2-benzimidazolyl)-2-(2-benzoxazolyl) ethane in 54 parts of nitrobenzene containing 0.6 part of iodine. Nitrogen was also introduced through the chlorine inlet tube to prevent suck-back into the chlorine container. After being heated 5 minutes longer at 140° to 150° C., the mixture was stirred with a solution of 18.3 parts sodium acetate trihydrate in 19 parts of isopropanol and 0.5 part of water for one-half hour at 85° to 90° C. The tan-brown product was isolated by filtration after removal of organic solvents by steam distillation, and produced excellent whitening effects on cotton and nylon fibers.

*Example 10*

11.9 parts of phosphorus pentachloride were added during one-half hour at 140° to 150° C. to a solution of 11.7 parts of 1-(2-benzimidazolyl)-2-(2-benzoxazolyl) ethane in 54 parts of nitrobenzene containing 0.6 part of iodine. After being heated 5 minutes longer at 140° to 150° C., the mixture was stirred with a solution of 68 parts of sodium acetate trihydrate in 71 parts of isopropanol and 2 parts of water for one-half hour at 85° to 90° C. The product was isolated by filtration after removal of organic solvents by steam distillation. The dried fluorescent agent was obtained in good yield and exhibited strong whitening effects on cotton and nylon fibers.

*Example 11*

The procedure in Example 10 was followed except that the dehydrogenating agent consisted of sulfur monochloride (8.4 parts) and the base treatment was effected with 18.3 parts of sodium acetate trihydrate in 19 parts of isopropanol and 1 part of water. The final product was similar to the one obtained in Example 10.

*Example 12*

The procedure in Example 10 was followed except that the dehydrogenating agent consisted of sulfur dichloride (6.4 parts) and the base treatment was effected with 18.3 parts of sodium acetate trihydrate in 19 parts of isopropanol and 1 part of water. The final product was similar to that obtained in Example 10.

*Example 13*

The procedure in Example 10 was followed except that the dehydrogenating agent consisted of thionyl chloride (7.9 parts) and the base treatment was effected with 36.6 parts sodium acetate trihydrate in 38 parts of isopropanol and 1 part of water. The final product was similar to that obtained in Example 10.

It will be understod that the details of the above examples may be varied within wide limits, without departing from the spirit of this invention. Thus, the amount of solvent used in the examples above varies from about 3 parts of nitrobenzene per part of the ethane compound (Example 2) to 20 parts (Example 8) and from 16 to 21 parts of acetic acid (Examples 6 and 7). This variable is not critical. It was found that the amount of solvent may be varied over a wide range without changing the yield.

The base treatment to remove loose halogen or halogen acid is not a critical part of the invention although it does contribute materially to the economy of the process when practiced on a commercial scale.

A purification step may be added at the end of the procedure, for instance, by digesting the crude 1-(2-benzimidazolyl)-2-(2-benzoxazolyl) ethylene at 75 to 135°

C. in a solvent, then cooling and filtering. As convenient solvents for this purpose may be used: ethyl acetate, carbon tetrachloride, trichloroethylene, 80% ethanol, benzene, chlorobenzene, o-dichlorobenzene, trichlorobenzene.

Purification may also be achieved by precipitation from an aqueous alcoholic caustic solution with acetic acid, or from an aqueous alcoholic solution of a strong acid with ammonium hydroxide.

The products obtained according to this invention may contain small amounts of halogen (usually, not over 3%). Otherwise, these products are essentially identical with that obtainable by oxidation with mercuric acetate, on the basis of ultra-violet, infra-red and fluorescent spectra, and also from dyetest results.

The requisite initial ethane compound for our invention may be synthesized in known manner, for instance by condensing o-phenylene diamine and succinic anhydride to form beta-benzimidazolyl-propionic acid, and further condensing the latter with o-aminophenol.

The application of the product of the process of this invention to textile fiber may be effected in known manner, for instance by treating the fiber with an aqueous dispersion of the fluorescent agent containing a dispersing agent. In a typical application, 1 part of cloth in 25 parts of water is heated at 130° F. for 25 minutes in the presence of a detergent (0.4% based on weight of water) and the fluorescent agent (0.0035 to 0.005% based on weight of fabric). Thereafter the cloth is passed through a wringer and allowed to dry.

I claim as my invention:

1. A process of producing 1-(2-benzimidazolyl)-2-(2-benzoxazolyl) ethylene, which comprises reacting upon 1-(2-benzimidazolyl)-2-(2-benzoxazolyl) ethane with from 1 to 2 moles of a halogenating agent selected from the group consisting of bromine, chlorine, phosphorus pentachloride, sulfuryl chloride, thionyl chloride, sulfur monochloride and sulfur dichloride, in the presence of iodine, at a temperature between 100° and 190° C., the reaction being carried out in an inert organic liquid which is a solvent for the ethane compound.

2. A process as in claim 1, the quantity of iodine present being not less than 1% based on the weight of the initial ethane compound.

3. A process as in claim 1, the initial ethane compound being dissolved in a solvent of the group consisting of nitrobenzene, trichlorobenzene and glacial acetic acid.

4. A process of producing 1-(2-benzimidazolyl)-2-(2-benzoxazolyl) ethylene, which comprises reacting upon a solution of 1 - (2 - benzimidazolyl)-2-(2-benzoxazolyl) ethane in an inert organic liquid of the group consisting of nitrobenzene, trichlorobenzene and glacial acetic acid, at a temperature between 100° and 190° C. and in the presence of iodine, with a halogenating agent selected from the group consisting of bromine, chlorine, phosphorus pentachloride, sulfuryl chloride, thionyl chloride, sulfur monochloride and sulfur dichloride, the quantity of halogenating agent being between 1 and 2 moles per mole of said initial ethane compound, and the quantity of iodine being not less than 1% based on the weight of said initial ethane compound, then treating the reaction mass with a basic compound to neutralize by-product halogen acid, subjecting the mass to steam distillation to remove the solvent, and filtering the residual aqueous mass to recover the ethylene compound free of inorganic salts.

References Cited in the file of this patent

UNITED STATES PATENTS

| 2,483,392 | Meyer et al. | Oct. 4, 1949 |
| 2,697,711 | Arnold | Dec. 21, 1954 |
| 2,697,713 | Arnold | Dec. 21, 1954 |